United States Patent [19]

Borchardt et al.

[11] 4,409,110

[45] Oct. 11, 1983

[54] ENHANCED OIL DISPLACEMENT PROCESSES AND COMPOSITIONS

[75] Inventors: John K. Borchardt; David L. Brown, both of Duncan, Okla.

[73] Assignee: Halliburton Company, Duncan, Okla.

[21] Appl. No.: 222,837

[22] Filed: Jan. 6, 1981

[51] Int. Cl.³ .............................................. E21B 43/22
[52] U.S. Cl. ................................ 252/8.55 D; 166/275; 166/294; 166/308; 252/8.55 R
[58] Field of Search .................... 252/8.55 R, 8.55 D; 166/275, 294, 305 R; 524/502, 516

[56] References Cited

U.S. PATENT DOCUMENTS

| | | | |
|---|---|---|---|
| 2,718,497 | 9/1955 | Oldham et al. | 252/8.5 |
| 2,761,843 | 9/1956 | Brown | 252/8.55 |
| 3,039,529 | 6/1962 | McKennon | 525/336 X |
| 3,780,806 | 12/1973 | Bott | 252/8.55 X |
| 3,804,173 | 4/1974 | Jennings | 252/8.55 X |
| 3,923,666 | 12/1975 | Dill | 252/8.55 |
| 4,152,274 | 5/1979 | Phillips et al. | 252/8.55 |
| 4,191,657 | 3/1980 | Swanson | 252/8.55 |

FOREIGN PATENT DOCUMENTS 38230  4/1979  Venezuela .

*Primary Examiner*—Herbert B. Guynn
*Attorney, Agent, or Firm*—Thomas R. Weaver; G. Keith deBrucky

[57] ABSTRACT

This invention provides novel aqueous fluid compositions which comprise a synergistic mixture of two classes of water dispersible or soluble polymers, i.e. (1) synthetic polymeric viscosifier and (2) polycationic organic polymer. These compositions are uniquely adapted for use in enhanced oil recovery. Addition of the polycationic organic polymer reduces the solution viscosity, increases the injectivity of the aqueous solution into low permeability formations. This reaction also reduces the shear degradation of the polymers during pumping, injection through the perforations, and during the period of relatively rapid fluid movement as the solution moves through an earthen or subterranean formation in the important zone within about a ten foot radius around the well bore. Once in an earthen formation, the polycationic organic polymer is rapidly adsorbed from the solution resulting in an increase in solution viscosity and improving the mobility ratio and also resulting in enhanced and/or increased oil recovery.

13 Claims, No Drawings

ENHANCED OIL DISPLACEMENT PROCESSES AND COMPOSITIONS

This invention relates to enhanced recovery of hydrocarbons by displacement using aqueous fluids and especially to the preparation and use of aqueous solutions of mixtures of synthetic polymer viscosifiers and polycationic organic polymers.

Synthetic organic polymers, particularly polyacrylamide, have been used to increase the viscosity of water used in secondary and tertiary oil recovery operations. U.S. patents teaching the use of polymers in subterranean strata include U.S. Pat. Nos. 3,406,754 to Gogarty; 3,367,418 to Routson; U.S. Pat. No. 2,827,964 to Sandiford; and U.S. Pat. No. 4,060,490 to Bernard. The use of gelled polymer solutions to improve injectivity profiles and/or vertical conformance in heterogeneous formations has been taught in U.S. Patents including U.S. Pat. No. 3,926,258 to Hessert et al; U.S. Pat. No. 3,334,689 to McLaughlin; U.S. Pat. No. 3,421,584 to Eilers et al; U.S. Pat. No. 4,098,337 to Argabright et al; and U.S. Pat. No. 3,502,149 to Pence, Jr. Methods to reduce or compensate for the mechanical degradation of polyacrylamide polymers include in situ polymerization as taught in U.S. Pat. No. 3,490,533 to McLaughlin and the use of high molecular weight polymers and copolymers such as taught in U.S. Pat. No. 3,973,629 to Knight, et al. The use of such polymers in a production well to reduce water production without substantially decreasing oil production is taught in U.S. Pat. No. 3,308,885 to Sandiford.

The use of synergistic blends of polymers to obtain increased solution viscosities has been reported. U.S. Pat. No. 4,169,818 to DeMartino describes the use of a synergistic viscosity mixture of hydroxypropyl cellulose and poly(maleic anhydride-co-alkyl vinyl ether). U.S. Pat. No. 4,038,206 to Karl teaches the use of blends of xanthan gum and locust bean gum to provide improved thickening properties. U.S. Pat. No. 3,765,918 to Jordan et al, teaches the use of blends of xanthan gum and guar gum to obtain improved thickening properties. The use of blends of cellulose ethers and polyacrylamides to produce matrix—plugging gels of improved gel strength is taught in U.S. Pat. No. 4,043,921 to Hessert and Clampitt.

Polyacrylamide solutions are known to be very susceptible to mechanical degradation which can greatly reduce solution viscosity. Reports on polyacrylamide degradation have been reported by Seright [SPE 9297, "The Effects of Mechanical Degradation and Viscoelastic Behavior on Injectivity of Polyacrylamide Solutions," presented at the 55th Annual Fall Technical Conference and Ephibition of the Society of Petroleum Engineers of AIME, Dallas, Tex. (September 21-24, 1980) and references cited therein.]

The above references and those listed below can be used by those skilled in the art in view of this disclosure to practice this invention and modifications thereof and these references are incorporated herein to the extent necessary therefor.

| ASSIGNEE | PAT. NO. | INVENTORS | DATE ISSUED |
| --- | --- | --- | --- |
| Union Oil of Cal. | 2,827,964 | Sandiford, et al | Mar. 25, 1958 |
| Pan American | 2,842,338 | Davis, et al | Jul. 8, 1958 |
| Halliburton Co. | 3,136,360 | Ramos, et al | June 9, 1964 |
| Halliburton Co. | 3,223,163 | Koch, et al | Dec. 14, 1965 |
| Union Oil Co. | 3,308,885 | Sandiford, et al | March 14, 1967 |
| Halliburton Co. | 3,334,689 | McLaughlin, et al | Aug. 8, 1967 |
| Dow Chemical Co. | 3,367,418 | Routson | Feb. 6, 1968 |
| Halliburton Co. | 3,374,834 | Ramos, et al | Mar. 26, 1968 |
| Marathon Oil Co. | 3,406,754 | Gogarty, et al | Oct. 22, 1968 |
| Dow Chemical Co. | 3,421,584 | Eilers, et al | Jan. 14, 1969 |
| Dow Chemical Co. | 3,502,149 | Pence, Jr. | Mar. 24, 1970 |
| Halliburton Co. | 3,557,562 | McLaughlin, Jr. | Jan. 26, 1971 |
| Phillips Petro. | 3,610,339 | Harvey, et al | Oct. 5, 1971 |
| Wyandotte Chem. | 3,634,305 | Johnson, et al | Jan. 11, 1972 |
| Halliburton Co. | 3,649,574 | Cole | Mar. 14, 1972 |
| Phillips Petro. | 3,667,546 | Parker | June 6, 1972 |
| General Mills Chem. | 3,765,918 | Jordan, et al | Oct. 16, 1973 |
| Nalco Chem. Co. | 3,780,806 | Bott | Dec. 25, 1973 |
| Phillips Petro. | 3,801,502 | Hitzman | Apr. 2, 1974 |
| Halliburton Co. | 3,857,443 | Cole | Dec. 31, 1974 |
| Texaco Inc. | 3,915,230 | Flournoy, et al | Oct. 28, 1975 |
| Phillips Petro. | 3,926,258 | Hessert, et al | Dec. 16, 1975 |
| Texaco Inc. | 3,939,911 | Maddox, Jr., et al | Feb. 24, 1976 |
| Shell Oil Co. | 3,943,059 | Ying C. Chiu | Mar. 9, 1976 |
| Shell Oil Co. | 3,945,437 | Chiu, et al | Mar. 23, 1976 |
| Texaco Inc. | 3,956,145 | Christopher, et al | May 11, 1976 |
| No Assignee | 3,973,629 | Knight, et al | Aug. 10, 1976 |
| Shell Oil Co. | 3,984,333 | van de Kraats, et al | Oct. 5, 1976 |
| Mobil Oil Corp. | 4,018,281 | Chang | Apr. 19, 1977 |
| Nalco Chem. Co. | 4,034,809 | Phillips, et al | July 12, 1977 |
| General Mills Chem. | 4,038,206 | Kari | July 26, 1977 |
| Phillips Petro. Co. | 4,043,921 | Hessert, et al | Aug. 23, 1977 |
| Phillips Petro. Co. | 4,049,054 | Wier | Sept. 20, 1977 |
| Texaco Inc. | 4,050,513 | Ching H. Wu, et al | Sept. 27, 1977 |
| Union Oil Co. | 4,060,490 | Bernard | Nov. 29, 1977 |
| Shell Oil Co. | 4,074,755 | Hill, et al | Feb. 21, 1978 |
| Texaco Inc. | 4,074,759 | Bousard | Feb. 21, 1978 |
| Marathon Oil Co. | 4,098,337 | Argabright, et al | July 4, 1978 |
| Texaco Inc. | 4,104,193 | Carter, et al | Aug. 1, 1978 |
| Phillips Petro. | 4,125,156 | Glinsmann | Nov. 14, 1978 |
| Marathon Oil Co. | 4,137,969 | Phalangas, et al | Feb. 6, 1979 |
| Soc. Nat'l. Elf Aqu. | 4,155,405 | Lino Vio | May 22, 1979 |

-continued

| ASSIGNEE | PAT. NO. | INVENTORS | DATE ISSUED |
| --- | --- | --- | --- |
| Texaco Inc. | 4,157,306 | Kalfoglou | June 5, 1979 |
| Celanese Corp. | 4,169,818 | DeMartino | Oct. 2, 1979 |
| Cities Serv. Co. | 4,195,689 | Chang | April 1, 1980 |
| Texaco Inc. | 4,207,946 | Haltmar, et al | June 17, 1980 |
| Phillips Petro. | 4,212,747 | Swanson | July 15, 1980 |
| Texaco Devel. Corp. | 4,216,098 | Hunter | Aug. 5, 1980 |
| Magna Corp. | 4,216,828 | Blair, Jr. | Aug. 12, 1980 |
| No Assignee | 4,217,146 | Avdzhiev, et al | Aug. 12, 1980 |
| Texaco Devel. Corp. | 4,217,230 | Hunter | Aug. 12, 1980 |
| Petroleum Rec. Inst. | 4,217,955 | Sigmund, et al | Aug. 19, 1980 |
| Texaco Canada Inc. | 4,217,956 | Goss | Aug. 19, 1980 |
| Texaco Inc. | 4,217,957 | Schievelbein | Aug. 19, 1980 |
| Texaco Devel. Corp. | 4,228,016 | Hunter | Oct. 14, 1980 |
| Texaco Devel. Corp. | 4,228,017 | Hunter | Oct. 14, 1980 |
| Texaco Devel. Corp. | 4,228,018 | Hunter | Oct. 14, 1980 |
| Texaco Devel. Corp. | 4,228,019 | Hunter | Oct. 14, 1980 |
| Texaco Inc. | 4,232,737 | Tyler, et al | Nov. 11, 1980 |

This invention concerns a method of reducing viscosity and shear degradation of certain water soluble viscosifying polymers in aqueous solution. This discovery is particularly useful in the recovery of hydrocarbons from porous, permeable subterranean earthen formations where viscous aqueous fluids are used to enhance recovery of the oil by functioning as a driving fluid to displace the oil and as a diverting and/or plugging fluid to direct fluid flow in the formation.

The invention provides a mixture or combination of two classes of polymers which are used in an aqueous fluid. The first class includes water soluble and water hydratable synthetic polymers which function as viscosifiers in aqueous fluid to produce a viscous aqueous fluid. The polymers are referred to as viscosifying or flood polymers. The second class of polymers is that of polycationic polymers or water soluble polymers containing numerous cationic atoms or groups which can be in a substantially linear polymer chain; in the backbone chain of a branched polymer; or in pendant groups or branch chains of polymers. The cationic group should not be excessively hindered from access by a high degree of branching and/or crosslinking so that the cationic group can associate with anionic sites in other polymers and/or on formation surfaces such as those of clay and/or sand platelets or particles. The cationic polymers are referred to as polycationic polymers or substantially linear polycationic polymers.

The processes and polymer formulations of this invention can be applied and/or used in any conventional manner for the uses described herein and modifications thereof. For one application the polymer formulation is simply mixed either in a batch vessel or by continuous injection of one or both polymers into a flowing fluid stream as the fluid is pumped or pressured through suitable conduit, such as, down tubing in a well bore, into the well or the well annulus and into adjacent formations and/or fractures. The fluid can be aqueous or it can contain other components in minor or major proportions; such as, liquid hydrocarbon phases, easily liquifiable gases (such as $CO_2$ or $N_2$), non-ionic surfactants, and solids or semi-solid phases. As used herein, minor means about 5% by weight and major means 30% or greater. The polymers can be added in substantially powdered form, as aqueous concentrates or as diluted aqueous fluids either alone, with other polymers or with other phases as indicated herein. Typically the polymer composition will be forced into the formation at less than the fracture pressure of the formation so that the polymer fluid flows into the pores and/or channels of the formation for maximum flow resistance deferential and/or maximum improvement in the mobility ratio, sweep efficiency and displacement of hydrocarbons present. For another application, the polymer fluid can be applied by one of the above methods but at a pressure higher than the adjacent formation fracture pressure to create a large fracture or channel in the formation thereby improving recovery of hydrocarbons. Any of the above methods can be used for acidizing either alone or in combination with the other treatments. For completion and/or drilling operations, the polymer fluids can be merely circulated through tubing and annulus and/or the fluid can be forced into portions of the adjacent formations.

The novel aqueous polymer formulations reduce the mechanical degradation of polymer viscosifiers during pumping, injection through narrow channels, such as perforations, and into porous, permeable beds, such as a formation face, and flow through the permeable formation zone within the high fluid flow rate region approximately ten feet in radius about a well bore. The polymeric viscosifier can be used to thicken an aqueous fluid improving the mobility ratio between flood water and oil in secondary or tertiary oil recovery, to improve injection profile and/or vertical conformance at an injection well, or to reduce water production at a producing well. Addition of a polycationic organic polymer to the synthetic polymer fluid or solution results in an unexpected substantial decrease in viscosity. Thus, the solution has improved injectivity relative to an aqueous fluid containing only the synthetic polymer. The polymer mixture characterized by lower solution viscosity has reduced mechanical shear degradation of the polymers during pumping, injection through the perforations and the formation face, and during movement of the solution in the high fluid velocity region during injection approximately ten feet in radius about the well bore. The cationic polymer then adsorbs onto the foundation surfaces. Its removal from solution results in an increase in solution viscosity. Viscosifier polymer adsorption is slight as compared to that of the polycationic organic polymer. Adsorption of the polycationic polymer also results in stabilizing the clays of the formation permitting the flood of reservoirs with fresh water polymer solutions which could not otherwise be successfully flooded. Adsorption of the polycationic organic polymer results in an increase in the remaining polymer solution viscosity improving the mobility ratio between the flood solution and oil in the formation. Increased solution viscosity also results in a more effective polymer slug to improve the injection profile or reduce water production by diverting more of the aqueous solution to less permeable zones. It has also been found that the mixed-polymer solutions of this invention result in higher recovery of oil from the formation as compared to previously used polymer solutions. Thus, the mixed polymer solution viscosity is substantially decreased during injection operations when a low viscosity is desirable and subsequently increased within the formation when a high solution viscosity is preferable.

Another method in which the compositions of this invention can be utilized as a matrix plugging agent is the formation of a crosslinked copolymer or terpolymer of the synthetic polymer viscosifier and the polycationic organic polymer through association of cationic and anionic sites of the polymers to form a precipitate. The anionic sites can be present in the synthetic polymer viscosifier such that solid precipitate forms very slowly. The solution can be placed in the desired portion of the formation prior to precipitate formation or the anionic groups can be generated by hydrolysis of the synthetic polymer viscosifier after the polymer solution has been placed in the desired portion of the formation. Hydrolysis is most advantageously promoted by dissolving the polymers in a solution in which the pH has been adjusted to 8–10.

The compositions of this invention can also be used as drilling fluids. As solids (cuttings) are produced by the action of the drill bit, the cationic organic polymer adsorbs on the surface of these solids. The solution viscosity of the drilling fluid increases leading to better suspension of the solid particles as the fluid containing the cuttings is pumped up the annulus of well bore to the surface. The solids are then allowed to settle out of the drilling fluid in a mud pit. Additional cationic organic polymer and viscosifying polymer are added as required such as by injection of the cationic polymer into the fluid as it leaves the mud pit for circulation through pumps and back down the drill string thereby reducing viscosity and shear-degradation as the fluid is pumped back down the drill string.

The compositions of this invention can also be used in fracturing and some fracture-acidizing applications. For example, a solution of cationic organic polymer and viscosifying polymer can be used to suspend sand or some other propping agent. A third polymer (or more than two) or a crosslinked polymer can also be present as long as it does not interfere. This suspension is pumped down a well bore at a pressure greater than the fracture pressure of the formation. As the fluid moves into the fracture and into the face of the fracture, the cationic organic polymer is adsorbed on or by the formation. The resulting increase in solution viscosity or decreased rate of viscosity decline due to temperature thinning and other factors enables the propping agent to be suspended for a longer period of time resulting in a longer fracture and conconsequently in increased hydrocarbon production.

The loss of polymer mixture fluid into the fracture face also results in adsorption of the cationic stabilizing polymer by the fracture face and in a corresponding stabilization of the fracture face, especially nearer the well bore. This produces an inherent fluid loss control mechanism with the high viscosity polymer solution in the formation along the fracture face. Since the fracture face nearer the well bore is exposed to the mixed polymer solution for the largest period of time, this area of the formation along the fracture face will have a thicker region containing less mobile high viscosity polymer solution. This inherent fluid loss mechanism will promote more complete clean-up and/or removal of the fracture fluid from the fracture and adjacent formation because formation fluids and pressure will promote removal of the fracture fluid from the far end of the fracture where the high viscosity polymer solution has only begun to penetrate the permeable formation face. This phenomenon should clean the fracture packing bed and gradually clean more of the viscous polymer solution from the fracture face as the well and formation are allowed to flow back.

The flood polymer can contain one or more of the randomly repeating units defined by the structure:

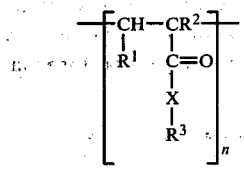

$R^1$ and $R^2$ are defined independently as hydrogen or alkyl groups containing 1 to 4 carbon atoms;

X is defined as oxygen, sulfur or $NR^4$ wherein $R^4$ is hydrogen or an alkyl group containing 1–6 carbon atoms;

$R^3$ is defined as hydrogen, an alkyl group containing 1 to 6 carbon atoms and optionally one or more heteroatoms independently selected from oxygen in the form of hydroxyl groups, carbonyl groups, or ester groups; nitrogen in the form of amine, amide, nitro, or onium groups and sulfur or phosphorous in regular covalent bonding, partially oxidized, or in the onium state; chlorine, bromine, iodine, or fluorine;

$R^3$ and $R^4$ together are defined as a cycloalkyl ring containing 4–6 carbon atoms and containing one or more heteroatoms independently selected from oxygen in the form of hydroxyl groups, carbonyl groups, or ester groups, nitrogen in the form of amine, amide, nitro, or onium groups and sulfur or phosphorous in regular covalent binding, partially oxidized, or in the onium state; and n is an integer sufficient to give a polymer molecular weight of 500,000 to 30,000,000.

If the flood polymer is a copolymer or terpolymer (i.e. contains more than one monomer unit), x in the comonomer or termonomer can also be OM where M is hydrogen, or a metal chosen from the metals in Group 1a of the Periodic Table of the Elements. This comonomer or termonomer comprises 10 mole percent or less of the repeating polymer units. A polymer of this description can either be formed as a copolymer or terpolymer or formed from an existing polymer by partial hydrolysis. For example, a partially hydrolyzed polyacrylamide can be formed by hydrolysis of polyacrylamide.

A preferred class of flood polymers are polyacrylamides containing 0–5 mole percent carboxylate groups.

Other preferred groups of flood polymers are polyacrylamide containing up to 10 mole percent carboxylate groups, random copolymers of 90 mole percent or more acrylamide and ten mole percent or less acrylic acid or acrylic acid salts. These two classes of polymers have the same general formula containing the following repeating polymer units in random order:

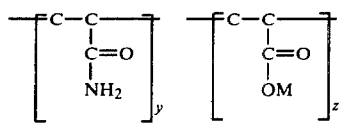

wherein: each M is independently hydrogen or any metal of Group 1A of the Periodic Table of the Elements.

y is equal to or greater than 90% of the total number of repeating polymer units. z is equal to or less than 10% of the total number of repeating polymer units.

Other preferred polymer classes are homopolymers of N-methyl-acrylamide or N,N-dimethylacrylamide. These polymers have the general formula:

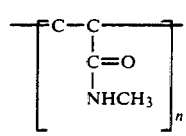

poly(N—methylacrylamide)

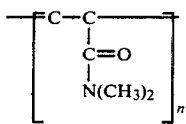

poly(N,N—dimethylacrylamide)

Other preferred polymer classes are copolymers or terpolymers of 0.1–99.9 mole percent acrylamide and 99.9–0.1 mole percent N-methylacrylamide and/or N,N-dimethylacrylamide.

Preferred classes of flood polymers are those polymer groups defined above, poly(methylmethacrylate), poly(ethylmethacrylate), poly(methacrylamide), poly(methylacrylate), poly(ethylacrylate), poly(N-methylmethacrylamide) and poly(N,N-dimethylacrylamide) having the formulae containing substantial portions of or substantially all of the following repeating polymer units:

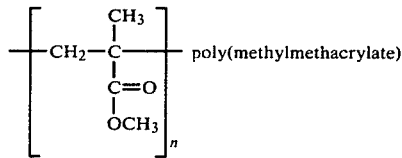

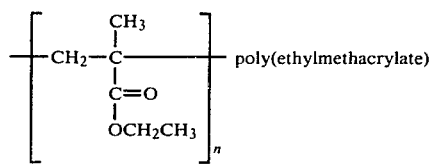

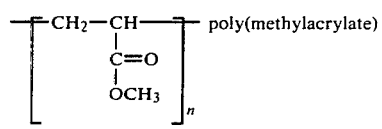

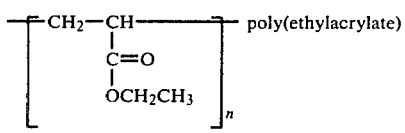

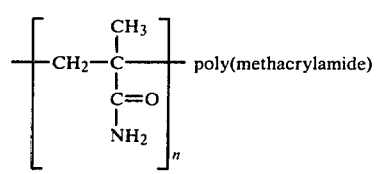

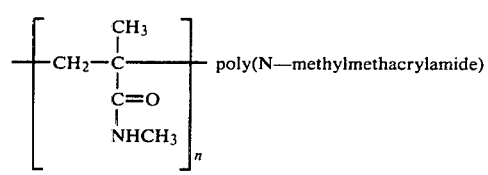

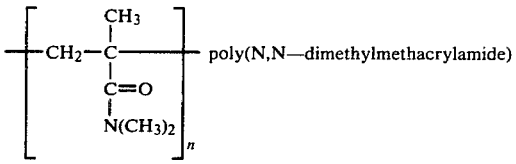

where n is defined as above.

Other preferred classes of polymers are copolymers or terpolymers of 0.1–99.9 mole percent acrylamide and 0.1–99.9 mole percent of one or more of the above monomers.

The preferred molecular weight range for all the above classes of flood polymers is 5,000,000 to 30,000,000. A more preferred molecular weight range is 15,000,000 to 30,000,000.

The class of cationic polymers used for the mixtures of this invention contains organic water soluble polymers with the cationic radical, group or atom being a nitrogen, phosphorous or sulfur atom arranged in the polymer chain, in a pendant portion of the chain or a pendant branch chain with other radicals, atoms or groups attached or associated to make the atom cationic. The cationic polymer preferably has at least one cationic atom for each repeating monomeric or polymer unit; however, the concentration of cationic atoms may be lower. The polymer units containing cationic atoms can be randomly separated by the same type of polymeric unit in which the corresponding atom is not cationic or by different polymeric units. That is the nitrogen, phosphorous or sulfur atom may not be cationic in certain polymer units and the cationic polymer can be a copolymer with more than one type or numberous types of polymeric units either in a random pattern in the polymer or in some regular subgroups. These copolymers typically contain about 2–6 different types of polymer units. They can be produced by initial polymerization of mixtures of monomer units, mixtures of prepolymer molecules, or mixtures of these. Copolymers can also be produced by modification of, substitution on or reaction with certain polymer units after the polymer chain is formed.

A preferred class of cationic polymers contain one or more repeating polymer units independently defined by and containing substantial proportions of the following repeating polymer units:

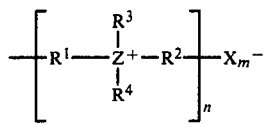

Wherein $R^1$ is an aliphatic, cycloaliphatic, or aromatic radical containing 2-40 carbon atoms, or a hydrogen radical. $R^2$, $R^3$ and $R^4$ are independently radicals defined as $R^1$ and containing 0-6 carbon atoms and also 0-2 hetero atoms or radicals defined as oxygen or nitrogen. Z is a cation independently selected from nitrogen, phosphorous or sulfur. X is an anion such as a halide, nitrate, sulfate, bisulfate, carbonate, hydroxide, borate, oxide, azide, cyanide, or phosphate to balance the charge of the cations; m is an integer which, with the valence of X, is sufficient to balance the cationic charges of the polymer units; and n is an integer equal to the number of monomer or polymer units required to give a molecular weight in the range of about 800-6,000,000. The number and arrangement of R groups and heteroatoms are such that the chemical structure and valences produce a stable polymer. For example, when $R^1$ is cycloaliphatic, Z and all or a portion of the other R radicals may or may not be in the polymer chain.

When Z is sulfur one of the R radicals may not be present or two or more of the R radicals may be considered to be combined.

The R or hydrocarbon radicals can be linear, branched or cycloaliphatic radicals, aromatic radicals, an unsaturated hydrocarbon radical and contain substituent radicals such as carbonyl, carboxyl, ester, halide, azo, amino, cyano, ether, mercapto, sulfonyl, nitro, keto, and the like. The R radicals can also be mono or divalent or have various connecting or terminal valences.

As indicated by the above formula, the bonds connecting the repeating polymer unit in the chain are indeterminate. These bonds can be connected through a single R group or through two different R groups or if the R groups are connected in a cyclic structure the bonds may be considered connecting through all R groups into the repeating polymer unit.

One preferred class of polymers has substantially all or major proportions of the random, regular or block repeating polymer units independently defined by the formula:

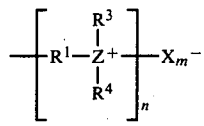

wherein $R^1$ is a divalent linear or branched chain alkylene group containing 2-40 carbon atoms, preferably 2-12 carbon atoms; $R^3$ is hydrogen or a linear or branched chain alkyl containing 1-6 carbon atoms and preferably 1-3 carbon atoms; $R^4$ is a radical defined the same as $R^3$ but can be different from $R^3$; and z, m, and n are defined above.

Another preferred class of cationic polymers has a substantial portion of the polymer repeating units independently defined by one or more forms of the formula:

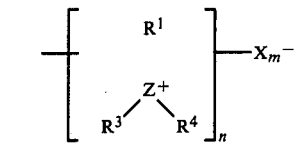

with $R^1$ being alkylene, unsaturated alkylene, substituted alkylene, or substituted unsaturated alkylene forming a cyclic hydrocarbon structure containing the cation Z defined as above and 0-3 hetero atoms. The heterocyclic hydrocarbon ring can be aliphatic, olefinic, aromatic or combinations thereof depending on the degree of unsaturation and substituents. The substitutents can be alkyl, alkenyl, alkynyl or aryl or contain 0-6 substituent groups as defined herein. Hetero atoms include phosphorous or sulfur in regular covalent, onium or oxidized state such as phosphate or sulfone. They also include nitrogen, oxygen, hydroxyl, carbonyl, or covalent halogen but they are not directly bonded to z. $R^3$ and $R^4$ are independently defined as above and preferably each R independently contains 1-6 carbon atoms and 0-2 hetero groups such as oxygen or nitrogen. Z, n and $X_m^-$ are independently defined as above.

Another preferred class of cationic polymer has a substantial portion of the polymer repeating units independently defined by one or more forms of the formula:

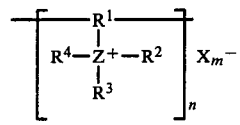

wherein $R^1$ is alkylene, alkenylene, alkynylene, arylene, or combinations of these in substantially linear or branched configurations. $R^1$ can contain 2-40 carbon atoms, 0-3 hetero atoms or groups and 0-10 substituents as defined herein. $R^2$, $R^3$, and $R^4$ are independently defined as hydrogen or alkyl, alkenyl, aryl or combinations thereof containing 1-40 carbon atoms, 0-3 hetero atoms or groups and 0-10 substituents as defined herein except that they are not in the polymer chain. The pendent linkage of $R^1$ and Z can range from a simple direct bond to a branch with several atoms between Z and the polymer chain including hetero atoms except that a hetero atom or group is not bonded directly to Z. Z, X, m and n are defined as above.

Examples of the cationic polymers include the polymers and copolymers containing substantial portions of the polymer units illustrated herein.

The organic polycationic polymers of this invention can generally be considered quaternary polymers with nitrogen or phosphorous as the quaternary or cationic atom with an aliphatic, cycloaliphatic or aromatic chain. Trivalent or tertiary sulfur can substitute for the quaternary nitrogen or phosphorous in the polymers. The cationic atom to carbon atom ratio is preferably about 1:2 to 1:36 and the molecular weight is above about 1,000 and preferably above about 30,000. The organic polycationic polymer is polar and therefore generally soluble in polar solvents or carrier fluids such as an aqueous media.

Preferred organic polycationic polymers of this invention can be characterized and illustrated by the following formula and examples.

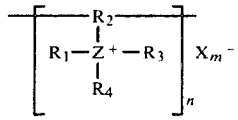

wherein $R_1$ is an organic aliphatic, cycloaliphatic, or aromatic radical containing 2-40 carbon atoms or a hydrogen radical and when $R_1$ is cycloaliphatic Z, $R_2$, $R_3$ or $R_4$ can be in the ring;

$R_2$, $R_3$ and $R_4$ are organic radicals independently defined as $R_1$ containing 0-6 carbon atoms and 0-2 oxygen or nitrogen atoms; when $R_1$ is cycloaliphatic it may or may not be in the organic polycationic polymer chain; when Z is sulfur $R_4$ is not present;

Z is a cation such as those derived from nitrogen phosphorous or sulfur;

X is an anion such as halide, nitrate, sulfate, bisulfate, carbonate, hydroxide, borates, oxides, azides, cyamides, phosphates, etc.;

n is an integer equal to the number of monomer units in the polymer required to give a molecular weight in the range of about 800-6,000,000 and preferably at least about 1,000 and more preferably above about 30,000; and m is an integer equal to the number of anions required to maintain electronic neutrality.

The organic or hydrocarbon radicals can be linear, branched or cycloaliphatic radicals, aromatic radicals, unsaturated radicals, substituted radicals or combinations thereof. The organic radicals can be homoaliphatic or heteroaliphatic, i.e., may or may not contain other atoms such as oxygen or nitrogen. The organic radicals can be homocyclic or heterocyclic, i.e., may or may not contain other atoms such as oxygen or nitrogen. Thus, the organic radicals can be substituted or unsubstituted alkyl, aryl or combinations thereof with each radical having 0-40 and preferably 0-6 carbon atoms.

The above class of organic polycationic polymers can be divided into the following preferred subclasses:

A. Alkyl Polycationic Polymers

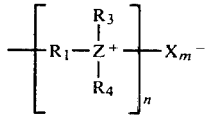

wherein $R_1$ is a divalent linear or branched chain alkyl group containing 2-40 carbon atoms, preferably in the range of 2-12 carbon atoms;

$R_2$ is contained within $R_1$;

$R_3$ is normal or branched alkyl or hydrogen containing 0-6 carbon atoms and preferably 1-3 carbon atoms;

$R_4$ is a radical defined the same as $R_3$, but it may or may not be identical to $R_3$, e.g., $R_3$=methyl and $R_4$=propyl; when Z is sulfur $R_4$ is not present;

Z is a cation such as those derived from nitrogen, phosphorous, or sulfur;

X is an anion such as halide, nitrate, sulfate, hydroxide, etc.;

n is an integer equal to the number of monomer units in the polymer required to give a molecular weight in the range of about 1,500-6,000,000; and m is an integer equal to the number of anions required to maintain electronic neutrality.

For the above subclass, preferred molecular weight ranges are up to about 1,000,000, especially about 40,000-80,000 for minimum viscosity and about 40,000-6,000,000 for higher viscosity aqueous solutions of the polymers. One preferred group of this subclass when Z is nitrogen, at least one of $R_3$ and $R_4$ is not hydrogen, methyl, ethyl or propyl.

B. Heteroaliphatic Polycationic Polymers

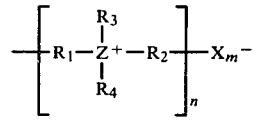

wherein $R_1$ is aryl, alkyl, arylalkyl, alkylaryl, alkenyl or combinations thereof. When $R_1$ is alkyl it contains or has appended one or more hetero atoms or groups. When $R_1$ is aryl, or alkyl aryl it can contain or have appended one or more hetero atoms or groups. $R_1$ can be normal-heteroalkyl or it can be branched extensively through the hetero-atoms or groups. The hetero-atoms or groups can be ethylenic (CH=CH—), acetylenic (—C≡C—), aryl, or nitrogen, phosphorous, or sulfur, in regular covalent bonding, partially oxidized, e.g., sulfone, or in the onium state, other hetero atoms or groups can be oxygen, hydroxyl, carbonyl, or covalent halogen. With the exception of ethylenic, or aryl, a hetero atom or group is not bonded directly to Z.

$R_2$ is an unsubstituted alkyl or it can be defined as $R_1$ but it is not required to be identical to $R_1$. $R_2$ can be included in $R_1$.

$R_3$ can be alkyl containing 1-6 carbon atoms, hydrogen or it can be defined as a monovalent form of $R_1$ but it is not required to be identical to $R_1$.

$R_4$ can be defined as $R_3$ but it is not required to be identical to $R_3$. When Z is sulfur $R_4$ is not present.

Z is a cation such as those derived from nitrogen, phosphorous or sulfur.

X is an anion such as halide, nitrate, sulfate, hydroxide, etc.

n is an integer equal to the number of monomer units in the polymer required to give a polymer with a molecular weight in the range of about 800-6,000,000.

m is an integer equal to the number of anions required to maintain electronic neutrality.

The polymer can branch through $R_1$, $R_2$, $R_3$, or $R_4$ in such manner that the main polymer chain is an arbitrary choice and $R_1$, $R_2$, $R_3$, and $R_4$ are arbitrary choices around any particular Z. A preferred molecular weight range is about 15,000-800,000.

A typical branched polymer is shown as follows:

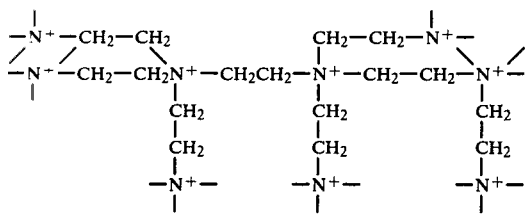

the anions are omitted for clarity.

C. Polycationic Polymers Containing Rings

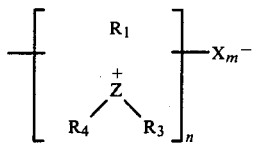

$R_1$ is alkylene, unsaturated alkylene, substituted alkylene, or substituted unsaturated alkylene forming a heterocyclic ring including Z. The heterocyclic ring can be aliphatic, olefinic or aromatic depending on the degree of unsaturation. Substituents can be alkyl, alkenyl, alkynyl, or aryl branches or substituents can be hetero atoms or hetero groups contained in the ring, appended to the ring, or appended to the branches. Hetero atoms or groups can be phosphorous or sulfur (in regular covalent, onium or oxidized state, e.g. phosphate or sulfone), nitrogen, oxygen, hydroxyl, carbonyl, or covalent halogen, a restriction being that the hetero atom or group is not bonded directly to Z. $R_2$ is included in $R_1$.

$R_3$ is a hydrogen radical or an organic radical containing 1-6 carbon atoms and 0-2 oxygen or nitrogen atoms. In the case of certain aryl polycationic polymers, with monomer units bonded through Z and elsewhere on the aryl, $R_3$ can be absent.

$R_4$ is defined the same as $R_3$ but is not required to be identical with $R_3$. When Z is sulfur $R_4$ is absent.

Z is a cation such as those derived from nitrogen, phosphorous or sulfur.

x is an anion such as halide, nitrate, sulfate, hydroxide, etc.

n is an integer equal to the number of monomer units in the polymer required to give a polymer with a molecular weight in the range of about 800-6,000,000.

m is an integer equal to the number of anions required to maintain electronic neutrality. Bonds containing monomer units can be through Z, other hetero atoms, $R_1$ (1 or 2 sites), or branches on $R_1$. A preferred molecular weight range is about 1,500-800,000.

D. Pendent Polycationic Polymers

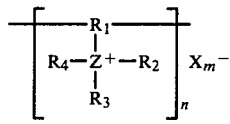

wherein $R_1$ can be alkylene, alkenylene, alkynylene, arylene, and linkages or branches of these in combinations. $R_1$ can contain hetero atoms or groups in the pendent linkage, on branch chains, on or in the polymer linkage. Hetero atoms or groups can be phosphorous or sulfur (in regular covalent, onium, or partially oxidized state, e.g., sulfone), nitrogen oxygen, hydroxyl, carbonyl, or covalent halogen, a restriction being that the hetero atom or group is not bonded directly to Z. The pendent linkage can range from a simple bond to a branch of $R_1$ several atoms long connecting Z to the polymer chain.

$R_2$, $R_3$ and $R_4$ can be defined independently as alkyl, alkenyl, aryl or combinations thereof or can be hydrogen, except that they unlike $R_1$ are not in the polymer chain. When $R_2$ is aryl including Z in a heterocyclic ring and/or when Z is sulfur $R_3$ or $R_4$ may not exist.

Z is a cation such as those derived from nitrogen, phosphorous, or sulfur. In one preferred class not more than two of the three R groups can be hydrogen. In another preferred class when $R_2$ is aryl and contains nitrogen, the aryl ring has at least on substituent or contains one other hetero atom or group.

X is an anion such as halide, nitrate, sulfate, hydroxide, etc.

n is an integer equal to the number of monomer units in the polymer required to give a polymer with a molecular weight in the range of about 800-6,000,000.

m is an integer equal to the number of anions required to maintain neutrality.

A preferred molecular weight range is about 1,500-800,000.

The following are examples of the preferred polycationic polymer classes having repeating polymer units such as those illustrated below.

(1) Where Z is sulfur, a sulfonium polymer

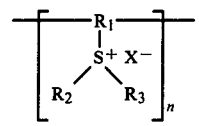

and one example is derived from the monomer $H_2C=CHCO_2CH_2CH_2S(CH_3)_2Cl$, poly(2-acryloxyethyldimethylsulfonium chloride);

$R_1$ = 2-acryloxyethyl, $R_2$ = methyl, $R_3$ = methyl, $R_4$ = non-existent, and X = chloride;

The above formula and R groups show a polymer wherein the R groups are not hydrogen.

(2) where Z is phosphorous, a phosphonium polymer

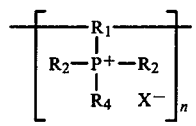

and an example monomer is

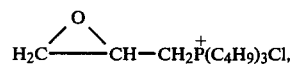

glycidyltributylphosphonium chloride; $R_1$ = glycidyl, $R_2$ = butyl, $R_3$ = butyl, $R_4$ = butyl, and X = chloride;

The above example shows a polymer wherein the cation Z is pendent and not in the polymer chain and at least three of the R groups are the same.

(3) where Z is nitrogen, quaternary ammonium polymers;

(3a) integral alkyl quaternary, example polymer:

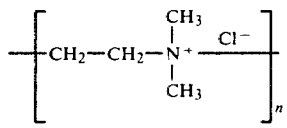

poly(dimethylethyleneammonium chloride), example polymer:

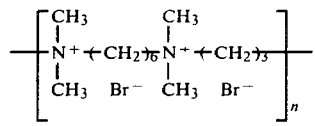

1,5-dimethyl-1,5-diazaundecamethylene polymethobromide example polymer:

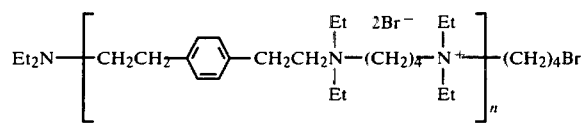

the condensation product of 1,4-bis(2-diethylaminoethyl)benzene and 1,4-dibromobutane.
example polymer:

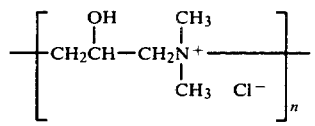

the condensation product of dimethylamine and epichlorohydrin example polymer:

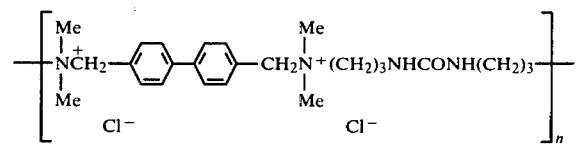

the condensation product of 1,3 bis[3-(dimethylamine) propyl] urea and 4, 4¹ bis(chloromethyl) biphenyl.
example polymer:

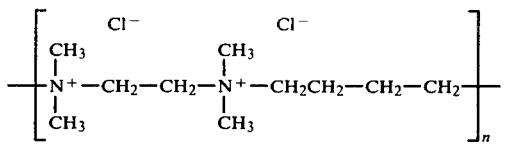

the condensation product of N,N,N',N'-tetramethylethylenediamine and 1,4-dichlorobutane;
The above examples show polymers wherein the R groups are not hydrogen; wherein the cation Z is in the polymer chain and in the second example is also in one of the R groups; wherein two of the R groups are the same and two of the R groups are different; and wherein at least two of the R groups are linear aliphatic radicals with not more than one and/or two different radicals in the polymer chain.

(3b) Integral quaternary in cyclic ring, example polymer:

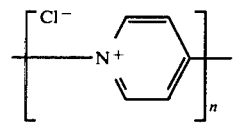

the condensation product of 4-chloropyridine;

(3c) integral alkyl, aryl quaternary, example polymer:

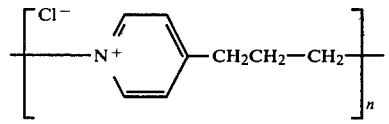

the condensation product of 1-(4-pyridyl)-3-chloropropane; another example polymer:

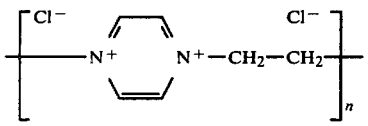

the condensation product of pyrazine and 1,2-ethylene dichloride; The above examples show polymers with one or more cationic Z groups in the polymer chain and in an aromatic radical which is also in the polymer chain with two different R radicals which are also in the polymer chain. Thus, the examples show heterocyclic aromatic and linear R groups which are in the polymer chain.

(3d) Pendent alkyl quaternary, example polymer:

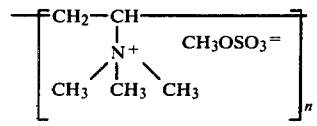

poly(vinyltrimethylammonium methylsulfate)

The above example shows a polymer with a pendent cationic Z radical and pendent R groups which are the same but different from the R group in the polymer chain; thus, Z and three of the R groups are not in the polymer chain.

(3e) Pendent quaternary on cyclic backbone, example polymer:

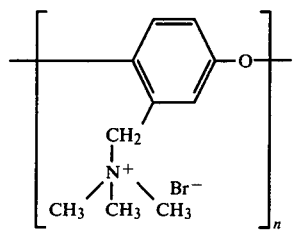

The above example shows a polymer with aromatic and hetero radicals in the polymer chain, a pendent cationic Z radical and three R groups which are aliphatic and not hydrogen or not in the polymer chain.

(3f) Pendent quaternary on carbocyclic ring, example polymer:

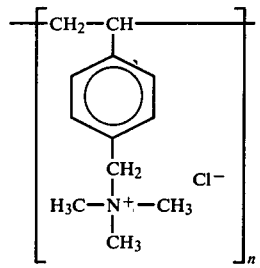

poly(vinyl-4-benzyltrimethylammonium chloride) example polymer:

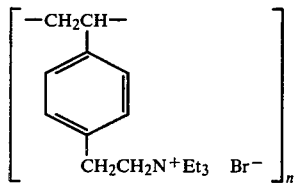

poly[4-(2-(diethylamino)ethyl)styrene]

(3g) Pendent quaternary nitrogen on polymethacrylate backbone, example polymer:

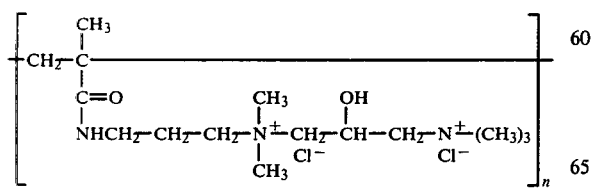

example polymer:

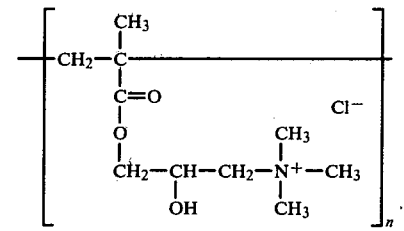

poly(3-methacryloxy-2-hydroxypropyltrimethylammonium chloride);

The above example shows different R groups with one in the polymer chain and three aliphatic R groups with one containing a cationic Z group and hetero atoms which are not in the polymer chain.

another example polymer:

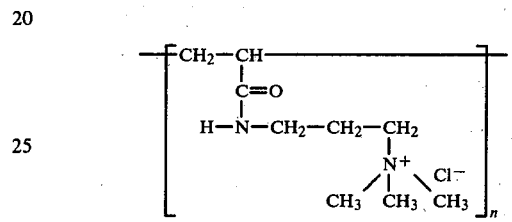

poly(acrylamido-3-propyltrimethylammonium chloride);

the above example shows a polymer with pendent R groups and cations which are not in the polymer chain, aliphatic R groups with one in the polymer chain, and a pendent group containing hetero atoms and more than one Z group.

(3h) Quaternary nitrogen in pendent heterocyclic ring, example polymers:

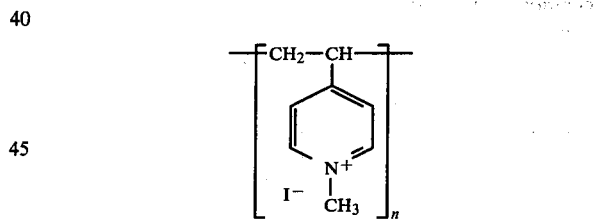

poly(4-vinyl-N-methylpyridinium iodide);

The above formula shows a polymer with a pendent hetero aromatic radical which is also a cationic radical and they are not in the organic polycationic polymer chain. Another example of this class is the condensation product of eipichlorohydrin and N-methylpyridine.

(3i) Heterocyclic ring containing quaternary nitrogen, example polymers:

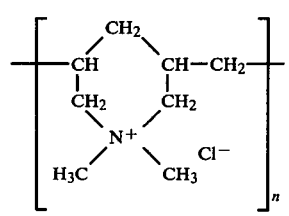

-continued

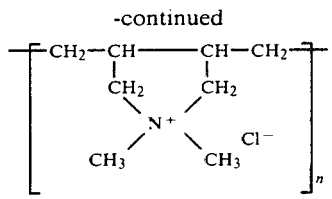

The above formulae show a pendent Z cation and pendent aliphatic R groups with at least two of the R groups having the same number of carbon atoms and with two R groups having the same number of carbon atoms and being linear aliphatic radicals in the polymer chain. The formulae also shows heterocyclic aliphatic groups in the polymer chain which also have pendent portions.

The above classes and subclasses of polycationic polymers can be substantially linear or branched. Examples (3a), (3b) and (3c) can be considered substantially linear polymers. Examples (1), (2), (3d), (3e), (3f), (3g), (3h) and (3i) can be considered branched. These examples show branching through at least one organic radical such as examples (1), (2), (3d), (3e), (3f), (3g), (3h) and (3i) and through a cation radical such as example (3a). Also examples (3d), (3e), (3f), (3g), (3h) and (3i) can be considered to have branching through pendent cation radicals or hetero groups. Other anions including organic or inorganic anions can be substituted for those shown such as a halide, sulfate, sulfonate, alkyl sulfonate, nitrate, hydroxide, sulstituted alkyl, etc.

EXAMPLE 1

The experiments summarized in the Table illustrate the unobviousness of the invention. The viscosity behavior of an essentially non-hydrolyzed, i.e. nonionic polyacrylamide (less than 5% hydrolysis) is compared to that of a nonionic polysaccharide, hydroxyethyl cellulose as a cationic polymer, 1,5-dimethyl-1,5-diazaundecamethylene polymethobromide (structure I) is added.

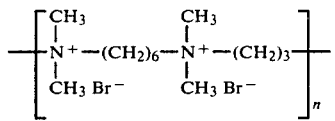

STRUCTURE I

The initial hydroxyethyl cellulose concentration was 4000 ppm (parts per million by weight) while the initial polyacrylamide concentration was 5400 ppm. These initial polymer concentrations were held constant as the concentration of cationic polymer was increased.

| Concentration of Cationic Polymer (ppm) | BROOKFIELD VISCOSITY of | | | | |
|---|---|---|---|---|---|
| | Hydroxyethyl Cellulose | | Polyacrylamide | | Fresh Water cps |
| | cps | % initial viscosity | cps | % initial viscosity | |
| 0 | 77.8 | 100.0 | 18.1 | 100.0 | 1.0 |
| 2000 | — | — | 9.3 | 51.4 | 1.9 |
| 4000 | 81.5 | 106.1 | 8.0 | 44.4 | 1.9 |
| 8000 | 81.2 | 105.7 | 7.6 | 41.8 | 2.1 |

The viscosity of the 4000 ppm hydroxyethyl cellulose solution remained essentially unchanged in the presence of the cationic polymer even when the cationic polymer concentration was twice that of the polysaccharide. In contrast, the presence of 2000 ppm cationic polymer (37% by weight of polyacrylamide) in a 5400 ppm polyacrylamide solution resulted in a viscosity decline of nearly fifty percent. Further increases in the concentration of the cationic polymer resulted in a modest further decline in viscosity indicating that a large concentration of cationic polymer is not required for a substantial viscosity decrease to be observed.

These results indicate that much lower concentrations of cationic polymer would be an effective amount or produce a significant reduction in viscosity of the viscosifying polymer solution. For some polymers, as low as 5% cationic polymer (and certainly 10% by weight of viscosifying polymer) would produce a reduction in viscosity of the viscosifying polymer solution.

Examination of the last column of the above table indicates that the cationic polymer is not an effective viscosifier and its behavior in fresh water is typical of many non-viscosifying water-soluble polymers.

When the cationic polymer was added to a xanthan gum solution, precipitation of a polysaccharide-cationic polymer complex was immediately observed. Xanthan gum is an anionic polysaccharide containing a carboxylate group in the polymer repeat unit.

EXAMPLE 2

This example illustrates that other cationic organic polymers are effective in reducing polyacrylamide solution viscosity. An essentially nonhydrolyzed (i.e. less than 5% hydrolyzed) polyacrylamid having a molecular weight of approximately $12-15 \times 10^6$ was used. A 2500 ppm solution of this polymer in fresh water had a Brookfield viscosity of 48.8 cps (centipoise) (UL adapter, 6 rpm) Under the same conditions in the presence of 2500 ppm poly(diallyldimethylammonium chloride) having a molecular weight of approximately $6.0 \times 10^5$, the solution viscosity was 44.0 cps, a decline of 9.8%. A further increase in cationic polymer concentration to 5000 ppm while holding the polyacrylamide concentration constant at 2500 ppm resulted in a viscosity of 41.6 cps, a decline of 14.8% from the value in the absence of the cationic polymer.

The results were somewhat different under higher shear conditions. Using Brookfield spindle No. 1 to 30 rpm, the viscosity of the 2500 ppm polyacrylamide solution was 73.2 cps. In the presence of 2500 ppm poly(diallyldimethylammonium chloride) the solution viscosity was 72.8 cps, a decline of only 0.6%. A further increase in cationic polymer concentration to 5000 ppm while holding the polyacrylamide concentration constant resulted in a viscosity of 58.8 cps, a decline of 19.7%.

EXAMPLE 3

The polymer solution studies of this example illustrate the effect of another cationic polymer, poly(dimethylamine-co-epichlorohydrin) on the solution viscosity of two acrylamide-dimethylaminoethyl methacrylate sulfuric acid salt copolymers. Polymer A contains 95.0 mole percent acrylamide while polymer B contains 79.1 mole percent acrylamide. The acrylamide copolymer concentration in fresh water was 1000 ppm.

| Cationic Polymer Concentration (ppm) | SOLUTION VISCOSITY of | | | |
|---|---|---|---|---|
| | Polymer A | | Polymer B | |
| | cps | % of initial viscosity | cps | % of initial viscosity |
| 0 | 14.9 | 100.0 | 9.0 | 100.0 |
| 500 | 5.7 | 38.3 | 7.6 | 84.4 |
| 1000 | 5.1 | 34.2 | 7.5 | 83.3 |
| 2500 | 3.8 | 25.5 | 4.5 | 50.0 |
| 5000 | 3.7 | 24.8 | 3.6 | 40.0 |

The same spindle and number of spindle revolutions per minute were used in all measurements. Polymer A, containing less cationic monomer appeared to be more sensitive to the addition of the poly(dimethylamino-co-epichlorohydrin). Most of the viscosity reduction observed was caused by a relatively low concentration (500 ppm, 50% of that of polymer A) of added cationic polymer. In contrast, the concentration of added cationic polymer had to be 2.5 times that of polymer D to effect a 50% viscosity reduction. This was in spite of the fact the polymer B contained more than twice as much cationic comonomer than polymer A. On the basis of a simple salt effect, the addition of cationic polymer to a solution of polymer B would be predicted to have a greater effect than the addition of the same amount of cationic polymer to a solution of the same concentration of polymer A. Thus, the effect of added cationic polymer on the solution viscosity of cationic monomeracrylamide copolymers seemed to involve more than a simple salt effect.

EXAMPLE 4

The results summarized in this example illustrate that the effect of added cationic organic polymers on polyacrylamide solution viscosity persists even in concentrated brines. The Brookfield solution viscosity of a 5000 ppm solution of an essentially unhydrolyzed polyacrylamide (i.e., less than 5% hydrolysis) in an oil field brine was 25.0 cps (spindle 2, 12 rpm). Under the same conditions in the presence of 4930 ppm poly(dimethylamine-co-epichlorohydrin) the solution viscosity was 12.5 cps, a decline of 50%. The brine contained nearly 20% dissolved solids and contained approximately 2% divalent metal cations. The brine analysis is given below.

| Ion | Concentration (mg/l) |
|---|---|
| $HCO_3^-$ | 153 |
| $Cl^-$ | 123,000 |
| $SO_4^{-2}$ | 0 |
| $Ca^{+2}$ | 17,800 |
| $Mg^{+2}$ | 2,493 |
| $Fe^{+2,+3}$ | 166 |
| $Na^+$ | 54,693 |
| Total dissolved solids | 198,305 |

EXAMPLE 5

This example illustrates the effect of cationic organic polymer structure on compatibility of the added polymer with the flood polymer. The polymers employed in the above examples contained cationic nitrogen atoms hindered by the steric bulk of neighboring groups (see structures I, II, and III).

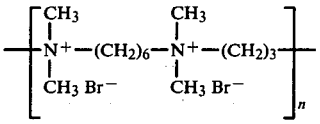

STRUCTURE I 1,5 dimethyl-1,5-diazaundecamethylene polymethobromide

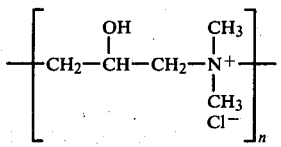

STRUCTURE II poly(dimethylamino-co-epichlorohydrin)

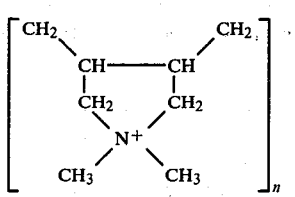

STRUCTURE III poly(diallyldimethylammonium chloride)

When these polymers were mixed with the essentially unhydrolyzed polyacrylamide homopolymers and copolymers of the earlier examples, no solids formation was observed even after 24 hours.

In contrast, when poly(methacrylamidopropyltrimethylammonium chloride), Structure IV, was mixed

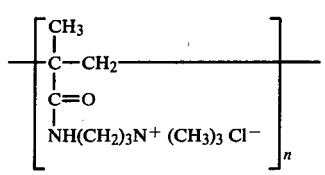

STRUCTURE IV with the essentially unhydrolyzed (i.e. less than 5% hydrolysis) polymer, a fine white opaque solid or precipitate was noticeable after three hours. Concentration of each polymer was 4000 ppm. This polyacrylamide was the same polymer used in Examples 1 and 4. In comparing Structure IV of the cationic organic polymer with Structures I-III, it will be noted that the pendant quaternary nitrogen atom is located on the end of a long side chain and is quite some distance from the bulky polymer backbone. In contrast, the quaternary nitrogen atoms of Structure I-III are held in close proximity to or are a part of bulky polymer backbone. Therefore interaction of the cationic nitrogen atom with anionic groups of the polyacrylamide is much more facile in the case of Structure IV.

Another cationic organic polymer further illustrates this point. The structure of this methacrylamide derivative (Structure V) also contains

STRUCTURE V

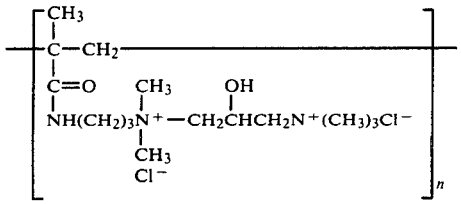

a quaternary nitrogen atom located toward the end of a very long side chain. When a solution of this polymer was mixed with a solution of the essentially nonhydrolyzed (i.e., less than 5% hydrolyzed) polyacrylamide used in Example 2, a fine white precipitate immediately began to form. Concentration of each polymer was 4000 ppm.

When the precipitation or reaction can be delayed for two to several hours as in the first set of polymers of this example, one may use the incompatibility as a method of plugging high permeability streaks in subterranean formations.

EXAMPLE 6

This example illustrates that cationic atoms, such as nitrogen, are required in the polymer for the viscosity reduction to occur. The same polyacrylamide polymer used in Example 1 and 4 was used in a concentration of 4000 ppm. The effect of 4000 ppm of poly(dimethylaminopropyl methacrylamide), structure VI, containing a tertiary nitrogen

STRUCTURE VI

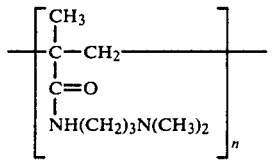

atom was compared to the methyl chloride salt of this polymer (Structure IV) containing a cationic nitrogen atom. The results are summarized below.

| Added Polymer | Brookfield Viscosity* | |
|---|---|---|
| | cps | % initial viscosity |
| None | 17.2 | 100.0 |
| Structure VI | 17.8 | 103.5% |
| Structure IV | 8.2 | 47.7% |

*The UL adapter at 12 rpm was used.

Study of the above data indicated that the cationic nitrogen atom was required since the structures of the added polymers were otherwise identical.

EXAMPLE 7
OIL RECOVERY EXPERIMENTS

The results of a series of laboratory displacement or flood experiments in 10.5–13.5 darcy 60 cm long by 3.1 cm. I.D. sand packs indicated that the viscosity reduction effect caused by cationic organic polymers did not reduce oil recovery at a room temperature of 74° F. The flood polymer A and cationic organic polymer used in Example 3 were employed. The crude oil used had a Brookfield viscosity of 13.5 cps (spindle 1, 30 rpm) and contained 0.3% asphaltenes and 2.7% paraffins.

| Test | Column Permeability (darcies) | Flood Polymer (ppm) | Cationic Polymer (ppm) | Solution Viscosity (cps)[a] | Oil Recovery (% OOIP[b]) |
|---|---|---|---|---|---|
| 1 | 12.1 | 500 | 0 | 37.0 | 90.1 |
| 2 | 12.1 | 500 | 500 | 8.2 | 96.0 |
| 3 | 10.5 | 250 | 0 | 14.0 | 93.4 |
| 4 | 12.3 | 250 | 433 | 3.0 | 99.2 |
| 5 | 13.5 | 125 | 0 | 8(3.3[c]) | 82.4 |
| 6 | 12.3 | 125 | 433 | 2.6[c] | 97.8 |

[a]Brookfield viscosity determined at ambient temperature using spindle No. 1 at 30 rpm unless otherwise noted.
[b]Percent Oil Originally In Place.
[c]Brookfield viscosity using UL adapter spindle at 30 rpm.

The first test summarized in the Table indicates the results observed using a 500 ppm solution of flood polymer in fresh water. The polymer solution was much more viscous than the oil (37 cps vs 13.5 cps). Oil recovery was 90.1%. When the flood polymer solution also contained 500 ppm cationic organic polymer (see Test 2), oil recovery was significantly greater, 96.0% even though the initial solution viscosity was less than oil viscosity. This is thought to be due to reduced shear damage and reduced flood polymer adsorption due to adsorption of the cationic organic polymer. Similar results were observed in Tests 3 and 4 at polymer concentrations of 250 ppm. The polymer solution viscosity in the absence of cationic organic polymer was approximately the same as the oil viscosity (14.0 cps vs 13.5 cps).

In Tests 5 and 6, polymer concentrations were 125 ppm. In the absence of cationic organic polymer, the flood polymer solution viscosity was 8 cps, less than the 13.5 cps oil viscosity. This was perhaps the cause of the relatively low oil recovery of 82.4%. The probable explanation of the higher oil recovery obtained in the presence of cationic organic polymer is that the cationic polymer preferentially and rapidly adsorbed on the silica acting as a sacrificial or blocking agent reducing flood polymer adsorption.

EXAMPLE 8

This example gives results observed in fresh water polymer floods of Berea cores. The same polymers and oil as in Example 7 were used. The experimental details are given in footnote "a" of the Table. The temperature of these tests was 115° F.

A 1000 ppm flood polymer concentration produced an oil recovery of 70%. The flood polymer was much more viscous than the oil (71 cps vs. 13.5 cps).

| Test[a] | Core Permeability (md) | Polymer A (ppm) | Cationic Polymer (ppm) | Solution Viscosity (cps) | Oil Recovery (% OOIP) |
|---|---|---|---|---|---|
| 7 | 6.1 | 1000 | 0 | 71 | 70.0 |
| 8 | 1.9 | 1000 | 990 | 9 | 76.2 |
| 9 | 31.2 | 500 | 0 | 35 | 89.9 |
| 10 | 55.7 | 500 | 500 | 8.3 | 100.0 |
| 11 | 40 | 125 | 0 | 8.0 | 75.3 |
| 12 | 57.2 | 125 | 490 | 8.0 | 83.9 |

[a]Polymer solution treatment volume was 10.0 cc. The polymer solvent was deionized water. Applied pressure was 100 psig and temperature was 115° F. The cores were hydrated in 5% sodium chloride solutions. The columns were flowed until no oil was produced in three successive 10 cc aliquots. Brookfield viscosity was determined using spindle 1 at 30 rpm.

When the flood polymer solution contained 990 ppm cationic organic polymer, the flood polymer solution viscosity was 9.0 cps, less than that of the oil. Despite the 87.3% decline in flood solution viscosity, the oil recovery was not diminished. Similar results were observed at polymer concentrations of 500 ppm. The difference in oil recoveries in Tests 9 and 10 are significant. Thus, increased oil recovery was obtained using the polymer mixture of this invention. This is thought to be due to decreased shear degradation as the polymer solution entered the core and decreased flood polymer adsorption due to absorption of the cationic organic polymer.

In Tests 11 and 12, it appeared that lower cationic organic polymer concentration did not sufficiently decrease the viscosity of this dilute (125 ppm) flood polymer solution. The increase in oil recovery in the presence of the cationic organic polymer was significant and thought to be due to decreased flood polymer adsorption due to cationic organic polymer adsorption.

EXAMPLE 9

This example illustrates that the cationic organic polymer preferentially adsorbs on smectite clay surfaces in the presence of a polyacrylamide containing less than five percent (5%) hydrolyzed amide groups. The solvent was the brine used in Example 4. The results of polymer adsorption tests are summarized in the table below:

| Polymer Solution Polymer | Concentration (ppm) | Smectite Clay Basal Spacing (A) |
|---|---|---|
| Polyacrylamide | 5000 | 15.0 |
| Cationic Polymer |  | 14.2 ± 0.2 |
| Polyacrylamide + | 5000 | 14.1 |
| Cationic Polymer | 5002 |  |

The total amount of polymer used in each test was 150% of the theoretical amount which produces two layers of adsorbed organic polymer between smectite clay crystals.

The polyacrylamide solution produced a smectite clay floc in which the solids tended to stick together. The X-ray adsorption spectrum contained a peak indicating a smectite clay basal spacing of 15.0 Å. The peak was well defined indicating fairly well oriented adsorption of a single layer of polyacrylamide.

The cationic organic polymer used was the poly(-dimethylamine-co-epichlorohydrin) used in Example 3. In a wide variety of aqueous solvents over a concentration range of 1000 ppm to 10,000 ppm, adsorption of this polymer on smectite clay produced a sharp x-ray adsorption peak indicative of a smectite clay interlayer basal spacing of 14.2±0.2 Å. The cationic organic polymer was adsorbed in a single, well-oriented layer. The solids or clay floc particles formed by cationic polymer adsorption did not tend to stick to each other.

When a mixed solution of both polymers was used, X-ray analysis indicated a well-defined adsorption peak at a basal spacing of 14.1 Å indicating the cationic polymer was selectively adsorbed. There was also X-ray evidence that a very small amount of polyacrylamide was adsorbed on the smectite clay. The solids in the clay floc formed by treatment of the smectite clay with the solution of both polymers tended to stick together.

We claim:

1. A process of polymer augmented treatment of a porous, permeable subterranean formation subject to water flooding techniques in connection with the recovery of hydrocarbons comprising injecting into said formation via an injection well an aqueous mixture of at least two types of water soluble polymers wherein the first polymer is a nonionic synthetic water soluble aqueous fluid viscosifier having a molecular weight of about 0.5 million–30 million and the second polymer is a cationic organic polymer which contains cationic atoms of nitrogen, sulfur, phosphorus or combinations thereof wherein the polymer has a molecular weight of about 800–6,000,000 and is adsorbed by the formation leaving a viscous aqueous fluid containing said first viscosifying polymer and the remaining aqueous fluid has a higher viscosity than the aqueous fluid containing both polymers.

2. A process of claim 1 wherein the cationic organic polymer comprises about 2–95% by weight of said mixture of polymers.

3. A process of claim 1 wherein the viscosifying polymer is selected from the group consisting of poly(N-methylacrylamide), poly(N,N-dimethylacrylamide), copolymers of acrylamide and N-methacrylamide and/or N,N-dimethylacrylamide, and mixtures thereof.

4. A process of claim 1 wherein substantially all of the cationic atoms are nitrogen.

5. A process of claim 1 wherein substantially all of the cationic atoms are sulfur, phosphorus or sulfur and phosphorus.

6. A process of claim 1 wherein the cationic organic polymer is selected from the group consisting of poly(-dimethylamine-co-epichlorohydrin), poly(diallyldimethylammonium chloride), 1,5-dimethyl-1,5-diazaundecamethylene polymethobromide, poly(methacrylamido-4,4,8,8-tetramethyl-4,8-diaza-6-hydroxynonamethylene dichloride), poly(N,N-dimethylethyleneammonium chloride), poly(N,N,N',N'-tetramethylethylene diamine-co-1,4 dichlorobutane), poly(-vinyltrimethylammonium methyl sulfate), poly(vinyltrimethylammonium methyl chloride) or mixtures thereof.

7. A process of claim 6 wherein the linear cationic polymer is poly(dimethylamine-co-epichlorohydrin).

8. A process of claim 6 wherein the major proportion of polymer units of the first polymer, the nonionic synthetic water soluble aqueous fluid viscosifier, are defined by at least one of the formula:

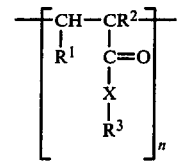

wherein $R^1$ and $R^2$ are independently hydrogen, or an alkyl group having 1–4 carbon atoms; X is oxygen, sulfur or $NR^4$; $R^3$ and $R^4$ are hydrogen, an alkyl group containing 1–6 carbon atoms and 0–3 heteroatoms independently defined as oxygen in the form of hydroxyl, carbonyl or ester; nitrogen in the form of amine, amide, or nitro; sulfur or phosphorus in regular covalent bonding or partially oxidized state; chlorine; bromine; iodine; or fluorine; or $R^3$ and $R^4$ together can be a cyclic aliphatic radical, an aromatic radical or a combination thereof with each hydrocarbon radical containing 4–6 carbon atoms and 0–3 heteroatoms as defined herein, and n is an integer giving a molecular weight of about 500,000 to 30,000,000; when there is a substantial portion of more than one type of repeating polymer unit present, X can be oxygen where $R^3$ is limited to hydrogen.

9. A process of claim 8 wherein the cationic organic polymer is adsorbed by the formation and functions as a means for stabilizing clay in said formation against swelling caused by aqueous fluids.

10. In a process of polymer augmented treatment for displacing a hydrocarbon from a porous, permeable strata subject to water flooding techniques using an aqueous displacement fluid, the process characterized by the injection into said strata of a mixture of at least two water soluble polymers in the aqueous fluid wherein the first of said polymer comprises a water soluble nonionic synthetic polymer wherein a substantial proportion of the repeating polymer units are defined by the formula:

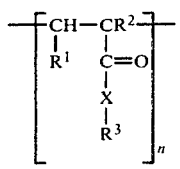

wherein $R^1$ and $R^2$ are independently hydrogen, or an alkyl group having 1–4 carbon atoms; X is oxygen, sulfur or $NR^4$; $R^3$ and $R^4$ are hydrogen, an alkyl group containing 1–6 carbon atoms and 0–3 heteroatoms independently defined as oxygen in the form of hydroxyl, carbonyl or ester; nitrogen in the form of amine, amide, or nitro; sulfur or phosphorus in regular covalent bonding or partially oxidized state; chlorine; bromine; iodine; or fluorine; or $R^3$ and $R^4$ together can be a cyclic aliphatic radical, an aromatic radical or a combination thereof with each hydrocarbon radical contaning 4–6 carbon atoms and 0–3 heteratoms as defined herein, and n is an integer giving a molecular weight of about 500,000 to 30,000,000; when there is a substantial portion of more than one type of repeating polymer unit present, X can be oxygen where $R^3$ is limited to hydrogen and the second of said water soluble polymers is a cationic organic polymer having a substantial proportion of the repeating polymer units defined by at least one of the formula:

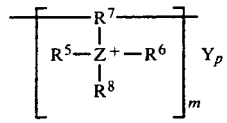

wherein Z is a heteroatom selected from the group consisting of sulfur, nitrogen or phosphorus;

$R^5$ is an organic aliphatic, cycloaliphatic, or aromatic radical containing 2–40 carbon atoms or a hydrogen radical;

When $R^5$ is cycloaliphatic Z and $R^6$, $R^7$ or $R^8$ can be in the ring;

When $R^5$ is cycloaliphatic it may or may not be in the organic polycationic polymer chain;

$R^6$, $R^7$ or $R^8$ are organic radicals independently defined as $R^5$ and can contain 0–6 carbon atoms and also 0–2 heteroatoms;

When Z is sulfur only three of the hydrocarbon radicals $R^5$, $R^6$, $R^7$ and $R^8$ are present;

Y is an anion associated with the cationic heteroatom Z;

m is an integer to give a molecular weight of about 800–6,000,000 with the radicals, ions and atoms arranged to satisfy chemical valence and structure requirements; and p is a number with a value that balances the ionic charges of the cationic heteroatoms and anions.

11. A process of claim 10 wherein substantially all of the cationic atoms are nitrogen.

12. A process of claim 10 wherein substantially all of the cationic atoms are sulfur, phosphorus or sulfur and phosphorus.

13. A process of claim 10 wherein said first water soluble polymer has a molecular weight of about 0.5 million–30 million and wherein said composition contains at least 5% by weight relative to the first polymer of the second water soluble polymer which is a substantially linear cationic polymer.

* * * * *

UNITED STATES PATENT AND TRADEMARK OFFICE
CERTIFICATE OF CORRECTION

PATENT NO. : 4,409,110

DATED : October 11, 1983

INVENTOR(S) : John K. Borchardt and David L. Brown

It is certified that error appears in the above-identified patent and that said Letters Patent is hereby corrected as shown below:

In column 10, lines 8 thru 15, delete

"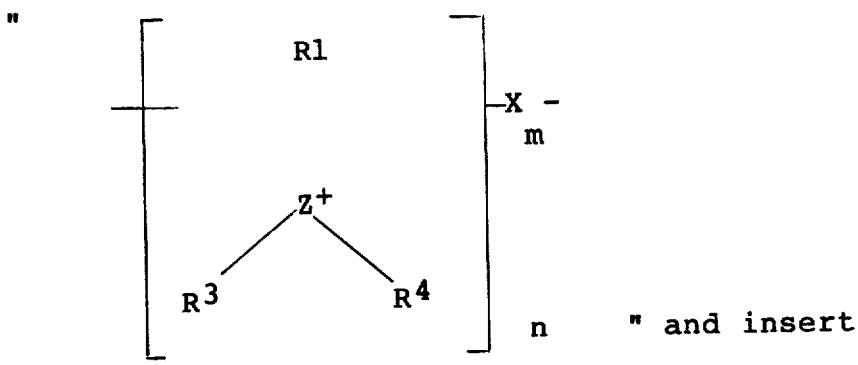 " and insert

--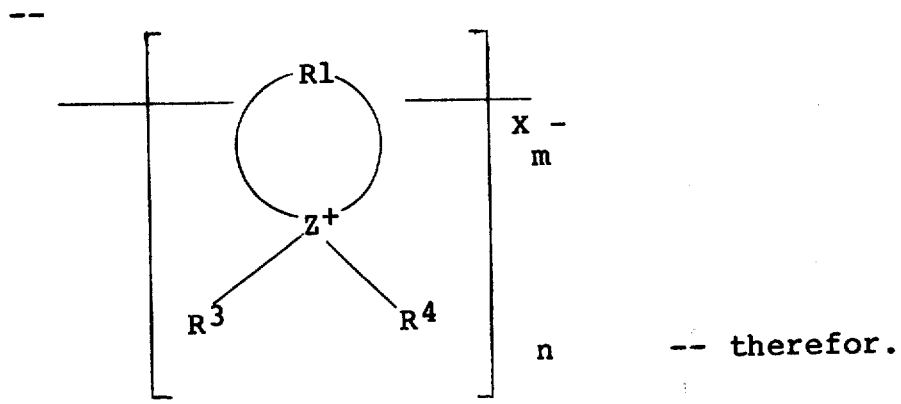 -- therefor.

UNITED STATES PATENT AND TRADEMARK OFFICE
CERTIFICATE OF CORRECTION

PATENT NO. : 4,409,110

DATED : October 11, 1983

INVENTOR(S) : John K. Borchardt and David L. Brown

It is certified that error appears in the above-identified patent and that said Letters Patent is hereby corrected as shown below:

In Column 10, line 56, delete "and" and insert --to-- therefor.

In Column 13, lines 15 thru 22, delete

"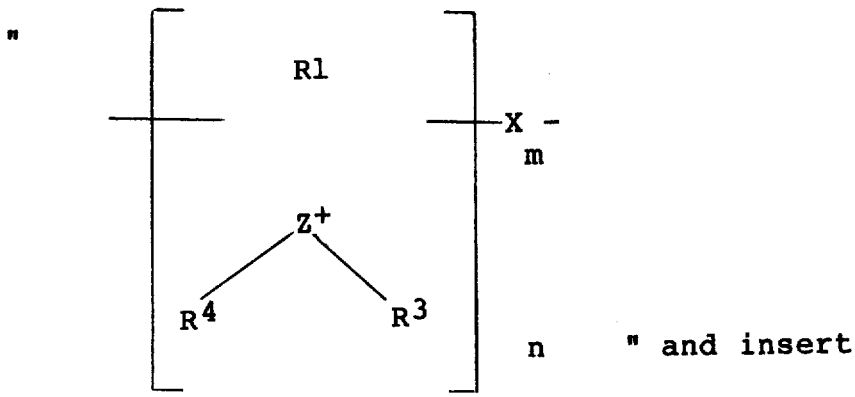 " and insert

-- 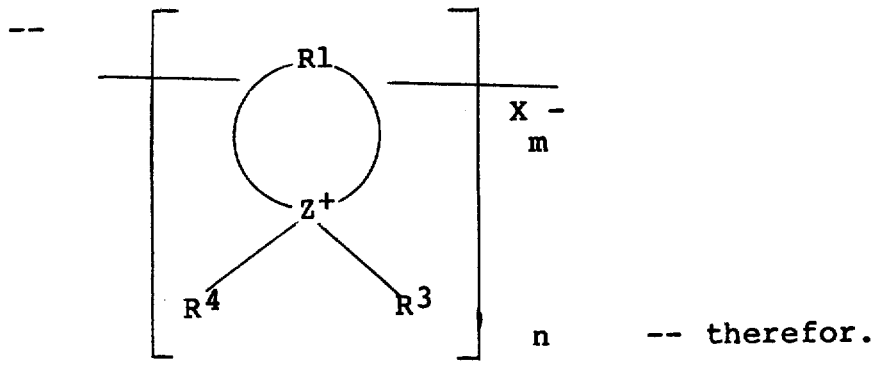 -- therefor.

UNITED STATES PATENT AND TRADEMARK OFFICE
CERTIFICATE OF CORRECTION

PATENT NO. : 4,409,110

DATED : October 11, 1983

INVENTOR(S) : John K. Borchardt and David L. Brown

It is certified that error appears in the above-identified patent and that said Letters Patent is hereby corrected as shown below:

In Column 19, line 9, insert
--polymer of diallyldimethylammonium chloride--.

In Column 19, line 15, delete "shows" and insert --show-- therefor.

In column 20, line 49, delete "to" and insert --at-- therefor.

In Column 22, line 20, delete
"poly(dimethylamino-co-epichlorohydrin)" and insert
--poly(dimethylamine-co-epichlorohydrin)-- therefor.

Signed and Sealed this

Twenty-second Day of May 1984

[SEAL]

Attest:

GERALD J. MOSSINGHOFF

Attesting Officer

Commissioner of Patents and Trademarks